J. LOWE AND J. J. LYTH.

METHOD OF AND APPARATUS FOR STRAIGHTENING WEFT THREADS.

APPLICATION FILED AUG. 6, 1919.

Reissued Nov. 9, 1920.

14,979.

2 SHEETS—SHEET 1.

Inventors
J. Lowe
J. J. Lyth
By Fetherstonhaugh & Co
Attys

J. LOWE AND J. J. LYTH.

METHOD OF AND APPARATUS FOR STRAIGHTENING WEFT THREADS.

APPLICATION FILED AUG. 6, 1919.

Reissued Nov. 9, 1920.

14,979.

2 SHEETS—SHEET 2.

Inventors
J. Lowe
J. J. Lyth
Fetherstonhaugh & Co
Attys.

UNITED STATES PATENT OFFICE.

JOHN LOWE AND JOHN JAMES LYTH, OF VALLEYFIELD, QUEBEC, CANADA.

METHOD OF AND APPARATUS FOR STRAIGHTENING WEFT-THREADS.

14,979. Specification of Reissued Letters Patent. Reissued Nov. 9, 1920.

Original No. 1,222,776, dated April 17, 1917, Serial No. 85,660, filed March 21, 1916. Application for reissue filed August 6, 1919. Serial No. 315,775.

*To all whom it may concern:*

Be it known that we, JOHN LOWE and JOHN JAMES LYTH, both subjects of the King of Great Britain, and residents of the city of Valleyfield, in the Province of Quebec and Dominion of Canada, have invented certain new and useful Improvements in Methods of and Apparatus for Straightening Weft-Threads, of which the following is a full, clear, and exact description.

This invention relates to improvements in method of and apparatus for straightening the weft threads of woven fabrics, and the object of the invention is to provide means for bringing the two ends of each thread into a line extending across the cloth at right angles to the selvages.

When the fabric leaves the loom, the warp and weft threads are exactly at right angles to one another and the effect is very pleasing. After the cloth has been subjected to various processes and is about to be rolled for shipment, it is found that the handling of the cloth has distorted and twisted the weft threads out of their original line. The warp threads are practically unaffected, as in the various processes, the tension of the cloth is always in longitudinal direction. Various machines have been devised for straightening the weft threads properly by pulling or stretching the cloth in a transverse direction. Certain of these machines are entirely satisfactory in that they pull each thread into a straight line between the edges of the cloth. If, however, the cloth goes into the stretching or tentering machine with the ends of the weft threads at one edge of the cloth in advance of the ends at the opposite edge, it is obvious that the machine can only straighten the weft threads but cannot restore them to the proper angular relation with the warp threads, so that in the finished cloth the weft threads lie in a diagonal direction, producing unsatisfactory and unsightly cloth. Various methods and apparatus have been tried out to overcome this difficulty, but without any great measure of success. It is obvious that to produce the desired result, one edge of the cloth must be advanced more than the other, and this advancement must be purely local in order that properly disposed threads in adjoining portions of the fabric shall not be displaced.

We have discovered that by passing the cloth over a series of rolls adjustably mounted so that they may be formed roughly into a cone or pyramid, the edge of the cloth at the base of the pyramid will be advanced through a longer path than that toward the apex, or in other words, the edge of the cloth at the base of the cone will be advanced in a longer path than the center, and the opposite edge of the cloth will be advanced in a shorter path than the center. By adjusting the angular relation of the rollers, the relative advance of the edges of the cloth may be regulated to a nicety to correct the displacement of the threads. This structure is capable of such adjustment that the base of the imaginary cone may be shifted from side to side of the machine as required.

In the drawings which illustrate the invention:—

Figure 1:
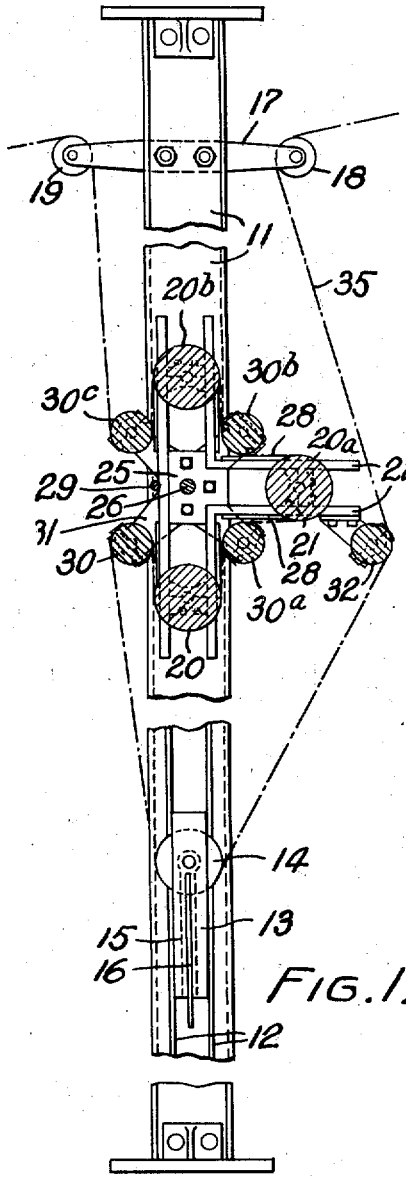
Figure 1 is a side elevation of the device partly broken away.
Figure 2:
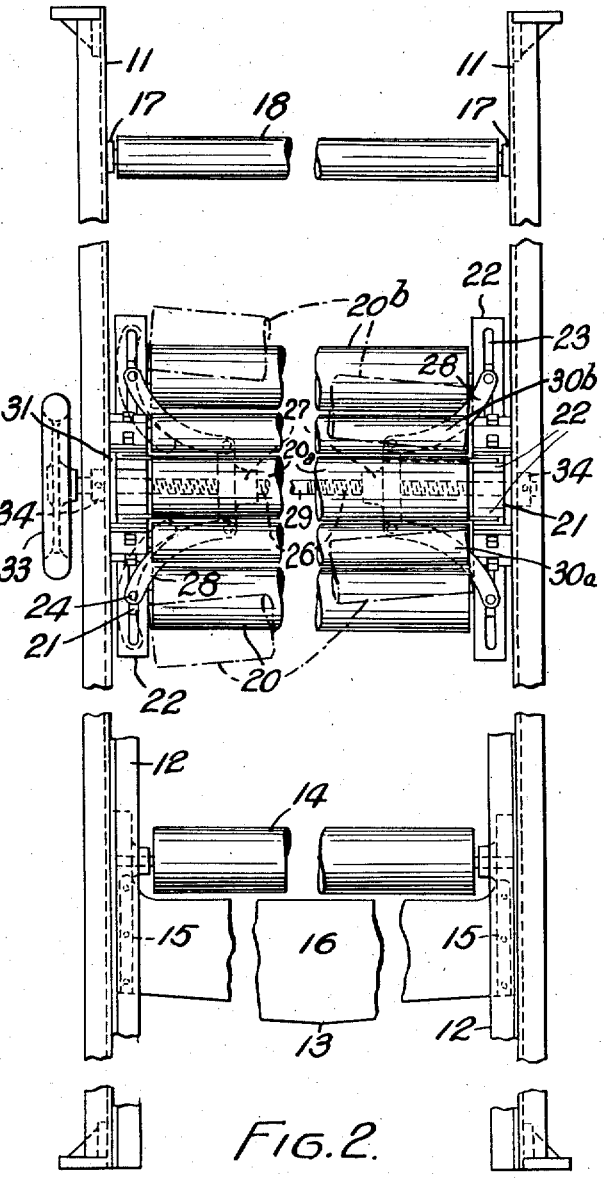
Fig. 2 is a front elevation.
Figure 3:
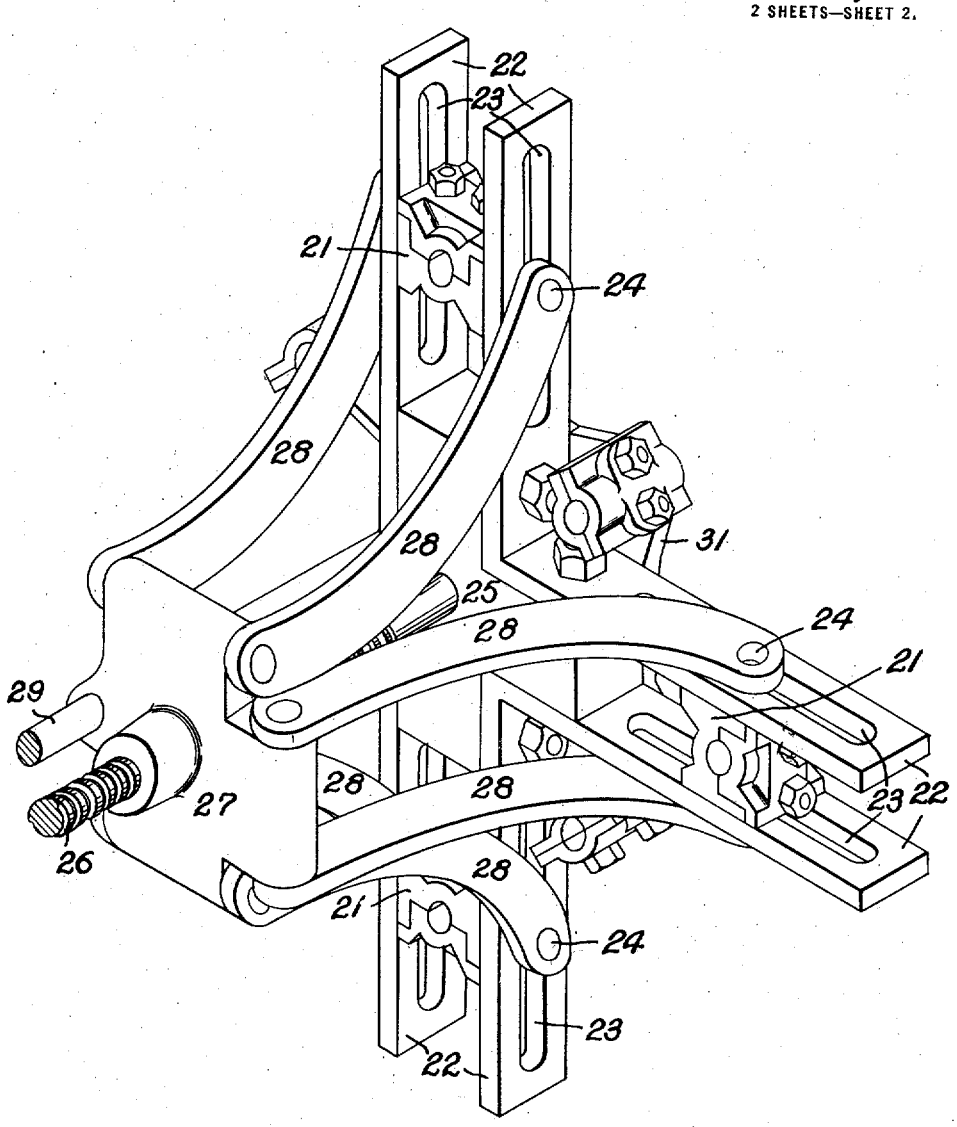
Fig. 3 is an isometric perspective view of one of the roll supporting members.

Referring more particularly to the drawings, 11 designates a pair of frame members, which may conveniently be uprights securable between the floor and ceiling of a room. Adjacent faces of these frame members are provided with guides 12 in which is mounted a suitably heavy slide 13 extending across the machine from frame to frame. This slide carries a roll 14. For convenience in manufacture, the slide may be composed of end castings 15 connected by a suitable web 16, such as boiler plate. The slide is of considerable weight, and its bearing surfaces are extended to such a degree that there is no possibility of it jamming or binding in the guides 12. In the upper part of the machine, an arm 17 is mounted on each frame, and projects to front and back of the machine. Idler rolls 18 and 19 are mounted between these arms. The active rolls, or those which are adjusted to form the imaginary cone previously referred to, are designated 20, $20^a$ and $20^b$ and in the drawing are shown to be three in number. It will be understood that any suitable number of rolls may be used. These rolls are mounted in bearings 21 which slide between guides 22 having slots 23 therein, through which trunnions 24 of the bearings pass. The guides 22 are connected together by central cores 25 rigidly attached to one on each frame member 11. These cores also form bearings for a shaft 26, which is threaded at each end, the threads preferably being both of the same direction and pitch. A nut 27 is mounted on each threaded portion of the shaft 26, and is connected by a pair of links 28 with the trunnions of each roll bearing. If desired, a bar or rod 29 may be provided parallel with the shaft 26 having slidable engagement with the nuts, and arranged to hold the same against revolution, thus relieving the links 28 of this function and of stress incident thereto. It will be readily understood that when the shaft is rotated, the nuts, being held against revolution, will be caused to travel longitudinally on the shaft. The connection between the nuts and the roll bearings transmits this movement to the bearings, so that the same shift in the guides toward or away from the shaft, according to the direction of shaft revolution. The threads being of the same direction, it is obvious that the nuts will travel in the same direction, that is, one toward and one away from the end of the shaft, so that the toggles formed by the links will force the roll bearings away from the shaft at one end and draw them toward the shaft at the opposite end. The result is that the rolls mounted between the bearings at opposite ends of the machine are brought to the form of an imaginary cone. If the direction of shaft revolution is reversed, the rolls are restored to parallel condition, and if the movement is continued, the rolls again assume the conical arrangement, with the difference that the base of the cone is at the opposite side of the machine.

In order that the cloth may be passed over the greatest possible surface of the rolls 20, $20^a$ and $20^b$ it has been found desirable to provide idler rolls 30 and $30^c$ between the straightening rolls 20 and $20^b$; $30^a$ between 20 and $20^a$; and $30^b$ between $20^a$ and $20^b$. These rolls for the arrangement shown in the drawings are four in number, and mounted in each end in bearing plates 31, which may be secured between the core block 25 and the frames 11. In order to keep incoming cloth out of contact with the straightening rolls, an idler roll 32 may be provided. The rolls 30 may be mounted so as to maintain parallel relation with one another, but if desired they may be arranged in a manner similar to the rolls 20. If the movement of the rolls 30 is in the same direction as the rolls 20, the effectiveness of the machine is diminished, while if the rolls 30 operate in the opposite direction to the rolls 20, the effectiveness may be increased. It is, however, preferred at this time to have the mounting of the rolls 30 rigid, so that the rolls maintain parallel relation. A hand wheel 33 may be provided to operate the shaft 26, which is held against longitudinal movement by collars 34. The cloth passing through the machine is designated 35.

The operation of the machine is quite simple, but has been found to be remarkably efficient and successful. The cloth comes to the machine over the idlers 18 and 32, and then passes under the roll 14, over the idler 30 and around the straightening roll 20, over the idler $30^a$, around the straightening roll $20^a$, over the idler $30^b$, around the straightening roll $20^b$, and over the idler $30^c$ to the idler 19. It will be readily seen that there is a loop of cloth between the rolls 30 and 32, in which the roll 14 hangs or floats. This roll 14 which is loaded by the weight of the slide 13 maintains proper tension in the cloth, and provides a spring in the cloth which will compensate for any lack of uniformity in the speed of cloth movement through the machine. The arrangement of the idler rolls 30 with respect to the straightening rolls 20 insures a large surface of contact between the cloth and the straightening rolls, so that the positioning of these straightening rolls has the maximum effect on the cloth. The arrangement also retains a considerable amount of cloth in the machine, so that variations in the speed of movement between the two edges are distributed through a considerable length of cloth, and do not affect the cloth in machines on either side. In practice, the straightening machine is preferably placed between a washing or starching machine and a tentering machine, so that the cloth is in moist condition, and may be much more readily operated upon than if in dry condition. The operator tending the machine watches the cloth entering and leaving the machine. As the cloth is stretched tight between the rolls 18 and 32, and between the rolls $30^c$ and 19, the provision of a light between the two layers of cloth will render such inspection very easy. When the operator sees a portion of the cloth coming to the machine with the weft threads extending diagonally, the hand wheel 33 is turned so as to draw the ends of the rolls 20 together at the side of the machine where the lagging ends of the weft threads enter, and simultaneously force apart the ends of the rolls at the opposite side of the machine where the advanced ends of the weft threads enter. This adjustment of the machine creates a shorter path for that edge of the cloth where the weft threads are already dragged back, and at the opposite side of the machine, creates a lengthened path for the edge of the cloth where the ends of the weft threads are already advanced. Midway between the ends of the rolls where no inward or outward movement occurs, the length of path remains uniform. As the cloth must as a whole travel at the same speed, it follows that the portion having the longer path must require longer to pass through the machine than that having the shorter path. Therefore, the edge of the cloth where the weft threads are advanced is retarded in its emergence from the machine until the lagging ends of the weft threads have been advanced sufficiently to emerge simultaneously with the ends which were advanced. Any ordinary operator will adjust the machine from time to time, according to the variation in position of the weft threads, so that when emerging, the ends of each thread are substantially in a line drawn at right angles to the edges of the cloth. The intermediate portion of the weft threads is of no consequence in this invention nor is it claimed that the weft threads are completely straightened, as this work is performed by any tentering machine, which pulls or stretches the cloth in a transverse direction. It frequently happens that when the threads of a piece of cloth are badly disarranged, application of the present invention does very little more than bring the two ends into proper line. This is, however, quite sufficient as the tentering machine will by its transverse stretching bring the threads straight. If the advanced ends of the weft threads subsequently occur on the opposite edge of the cloth, the rotation of the shaft is reversed until the stretching cone is also reversed, that is, the small end is expanded and the large end is contracted. In the adjustment of the machine, particularly when sudden and considerable changes are made in the angular relation of the stretching rolls, it will happen that there is frequently a slight acceleration of the speed of travel of the whole cloth through the machine. Ordinarily, this would act as a drag on the machine behind and form a slack between the straightening machine and the machine next in line. Such a contingency is, however, completely overcome by the use of the floating roll 14, which merely rises on such occasions, and when the speed and tension is again restored to normal, falls to approximately its original position.

Having thus described our invention, what we claim is:—

1. A method of straightening the weft threads of cloth, which consists in accelerating the advance of one edge of the cloth with respect to an intermediate portion and retarding the advance of the opposite edge with respect to an intermediate portion, and in maintaining a variable sized surplus of cloth under uniform tension.

2. In a device of the character described, a plurality of rolls, and means for simultaneously drawing together adjacent ends of said rolls and separating the opposite adjacent ends of said rolls, the angular movement of all rolls being equal.

3. In a device of the character described, a plurality of rolls, toggle mechanism connecting said rolls at their ends, and means for simultaneously operating said toggle mechanism to draw the rolls together at one end, and force the rolls apart at the opposite end, the angular movement of all rolls being equal.

4. In a device of the character described, a plurality of rolls, and means for simultaneously adjusting the alternate rolls relatively in opposite directions at opposite ends.

5. In a device of the character described, a plurality of adjustable rolls, a plurality of non-adjustable rolls arranged alternately with the adjustable rolls, and means for simultaneously moving opposite ends of the adjustable rolls to different positions relatively to the non-adjustable rolls.

6. In a device of the character described, a plurality of rolls adjustable toward and away from one another simultaneously at opposite ends, a plurality of non-adjustable rolls arranged alternately with the adjustable rolls, an idler roll, a floating roll arranged to be supported by material passing between the idler and adjustable rolls, and means for holding said roll against inclination by material supporting same.

7. In a device of the character described, slotted guides, bearings slidable between said guides, trunnions on said bearings operating the guide slots, rolls mounted in said bearings, a threaded shaft, nuts irrevolubly mounted on said shaft, and links pivotally connecting said nuts and bearing trunnions.

8. A method of straightening the weft threads of cloth which consists in locally advancing portions of one edge and simultaneously retarding corresponding portions of the opposite edge, alternately with advancing the same portion uniformly across its entire width.

9. A method of straightening the weft threads of cloth, which consists in locally advancing the cloth on one side of a longitudinally neutral line and simultaneously retarding the cloth on the opposite side of said line, said advancement and retardment increasing gradually from said neutral line to the edges of the cloth.

10. A method of straightening the weft threads of cloth, which consists in locally advancing the cloth on one side of a longitudinal neutral line and simultaneously retarding the cloth on the opposite side of said line, said advancement and retardment increasing gradually from said neutral line to the edges of the cloth, and alternating with such advancement periods of advancement uniform across the entire width of the cloth.

11. A method of straightening diagonally displaced weft threads of cloth, which consists in advancing the cloth at uniform rate across its entire width alternately with a differential rate of advancement across its width, said differential rate of advancement being greater than the uniform rate at one edge and less than the uniform rate at the opposite edge, and of the uniform rate at a line intermediate the edges.

12. A method of straightening the weft threads of cloth which consists in advancing a portion of the cloth intermediate the edges at a uniform rate of speed, and increasing or diminishing the rate of advance from said intermediate portion toward the edges and alternating the increase and reduction of advance rate from edge to edge of the cloth, according as the ends of the weft threads are more advanced at one edge or other of the cloth.

13. A method of straightening the weft threads of cloth, which consists in advancing a portion of the cloth intermediate the edges at a uniform rate of speed, and increasing or diminishing the rate of advance from said intermediate portion toward the edges, and alternating the increase and reduction of advance rate from edge to edge of the cloth, according as the ends of the weft threads are more advanced at one edge or other of the cloth, and alternating with such variable advancement of the cloth across its entire width at the same rate as said intermediate portion.

14. In a device of the character described, several rolls, and means for adjusting alternate rolls into a conical arrangement having the axis thereof parallel with the axis of the remaining rolls.

15. A method of straightening diagonally disposed weft threads of cloth, which comprises passing the edge of the cloth containing the advanced ends of the threads through a longer path than that traveled by the medial line of the cloth and passing the edge of the cloth containing the lagging ends of the threads through a shorter path than that traveled by the medial line of the cloth, whereby the arrival of the advanced ends of the threads at a line at right angles to the medial line of the cloth is delayed and made coincident with the arrival of the lagging ends of the threads at said line.

16. A method according to claim 15, having the additional step of simultaneously varying the lengths of the paths of the cloth edges according to the amount of displacement of the threads.

In witness whereof, we have hereunto set our hands.

JOHN LOWE.
JOHN JAMES LYTH.